United States Patent
Yang et al.

(10) Patent No.: US 12,528,732 B2
(45) Date of Patent: Jan. 20, 2026

(54) HOUSING ASSEMBLY, PREPARATION METHOD THEREFOR, AND ELECTRONIC DEVICE

(71) Applicant: GUANGDONG OPPO MOBILE TELECOMMUNICATIONS CORP., LTD., Dongguan (CN)

(72) Inventors: Xiao Yang, Dongguan (CN); Pan Zou, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 1034 days.

(21) Appl. No.: 17/582,411

(22) Filed: Jan. 24, 2022

(65) Prior Publication Data

US 2022/0144693 A1 May 12, 2022

Related U.S. Application Data

(63) Continuation of application No. PCT/CN2020/092168, filed on May 25, 2020.

(30) Foreign Application Priority Data

Aug. 27, 2019 (CN) .......................... 201910795735.0

(51) Int. Cl.
C03C 15/00 (2006.01)
H04M 1/02 (2006.01)

(52) U.S. Cl.
CPC .......... *C03C 15/00* (2013.01); *H04M 1/0266* (2013.01); *Y10T 428/24355* (2015.01)

(58) Field of Classification Search
CPC ................. C03C 15/00; H04M 1/0266; Y10T 428/24355
See application file for complete search history.

(56) References Cited

U.S. PATENT DOCUMENTS

| | | | |
|---|---|---|---|
| 3,616,098 A | 10/1971 | Falls | |
| 2015/0110308 A1* | 4/2015 | Tai | .......................... H04R 1/345 381/388 |
| 2015/0175478 A1 | 6/2015 | Ravichandran et al. | |
| 2018/0215657 A1* | 8/2018 | Jin | .......................... C03C 19/00 |

FOREIGN PATENT DOCUMENTS

| | | |
|---|---|---|
| CN | 101531463 A | 9/2009 |
| CN | 101585661 A | 11/2009 |
| CN | 101913772 A | 12/2010 |

(Continued)

OTHER PUBLICATIONS

Extended European Search Report dated Jun. 29, 2022 received in European Patent Application No. EP20859264.2.

(Continued)

*Primary Examiner* — Donald M Flores, Jr.
(74) *Attorney, Agent, or Firm* — Sheppard, Mullin, Richter & Hampton LLP

(57) ABSTRACT

A housing assembly, a preparation method therefor and an electronic device are provided in the present disclosure. The housing assembly includes a glass body. The glass body has a first surface and a second surface opposite to the first surface. A plurality of protrusions are formed on the first surface. The protrusion is a pointed protrusion, or the protrusion includes at least one edge.

20 Claims, 5 Drawing Sheets

(56) References Cited

FOREIGN PATENT DOCUMENTS

| | | |
|---|---|---|
| CN | 102448904 A | 5/2012 |
| CN | 102887647 A | 1/2013 |
| CN | 103193393 A | 7/2013 |
| CN | 103346200 A | 10/2013 |
| CN | 105330166 A | 2/2016 |
| CN | 105439455 A | 3/2016 |
| CN | 105538936 A | 5/2016 |
| CN | 106219992 A | 12/2016 |
| CN | 106746702 A | 5/2017 |
| CN | 108262646 A | 7/2018 |
| CN | 108545952 A | 9/2018 |
| CN | 109437578 A | 3/2019 |
| CN | 109574510 A | 4/2019 |
| CN | 110467354 A | 11/2019 |
| EP | 1357092 A1 | 10/2003 |
| JP | 58161945 A | 9/1983 |
| JP | 4398156 B2 | 1/2010 |
| WO | 2010117673 A1 | 10/2010 |
| WO | 2016040151 A1 | 3/2016 |
| WO | 2018140581 A1 | 8/2018 |
| WO | 2019125883 A1 | 6/2019 |

OTHER PUBLICATIONS

First Office Action from corresponding Chinese Application No. 201910795735.0, dated Feb. 23, 2021. English translation is attached.
Supplementary search from corresponding Chinese Application No. 201910795735.0, dated Aug. 3, 2021.
Grant Notice from corresponding Chinese Application No. 201910795735.0, dated Sep. 10, 2021. English translation is attached.
International Search Report and Written Opinion dated Aug. 26, 2020 in International Application No. PCT/CN2020/092168. English translation is attached.

\* cited by examiner

HOUSING ASSEMBLY, PREPARATION METHOD THEREFOR, AND ELECTRONIC DEVICE

CROSS-REFERENCE TO RELATED APPLICATION(S)

The present application is a continuation-application of International Application No. PCT/CN2020/092168 filed on May 25, 2020, that claims priority to Chinese Patent Application No. 201910795735.0 filed on Aug. 27, 2019, the contents of which are incorporated herein by reference in their entirety.

TECHNICAL FIELD

The present disclosure relates to the technical field of electronic devices, and in particular to a housing assembly, a preparation method therefor, and an electronic device.

BACKGROUND

With the development of technology and the increase of users' aesthetic requirements, designing the appearance of electronic devices such as cell phones is becoming a more and more demanding task. Therefore, in order to meet the increasingly high aesthetic requirements of users, the appearance of electronic devices needs to be constantly developed and enriched, to provide users with a better user experience.

SUMMARY

In an aspect of the present disclosure, a housing assembly is provided. According to an embodiment of the present disclosure, the housing assembly includes a glass body having a first surface and a second surface opposite to the first surface. A plurality of protrusions are formed on the first surface. The protrusion is a pointed protrusion, or the protrusion includes at least one edge.

In another aspect of the present disclosure, a method for preparing a housing assembly is provided. According to an embodiment of the present disclosure, the method includes: etching at least part of an outer surface of a glass body with an etchant; water-washing the glass body that has undergone the etching. The housing body has a first surface and a second surface opposite to the first surface, and a plurality of protrusions are formed on the first surface. The protrusion is a pointed protrusion, or the protrusion includes at least one edge.

In a further aspect of the present disclosure, an electronic device is provided. According to an embodiment of the present disclosure, the electronic device includes a housing assembly, a display assembly, and a motherboard. The housing assembly includes a glass body which has a first surface and a second surface opposite to the first surface. A plurality of protrusions are formed on the first surface. The protrusion is a pointed protrusion, or the protrusion includes at least one edge. The display assembly is connected to the housing assembly, and a mounting space is defined between the display assembly and the housing assembly. The motherboard is disposed in the mounting space and electrically connected to the display assembly.

BRIEF DESCRIPTION OF THE DRAWINGS

To describe technical solutions in the implementations of the present disclosure more clearly, accompanying drawings are briefly introduced below for describing the implementations. Apparently, the accompanying drawings in the following merely illustrate some implementations of the present disclosure, and persons skilled in the art may also obtain other obvious variations based on these accompanying drawings without creative efforts.

DETAILED DESCRIPTION

Figure 1:
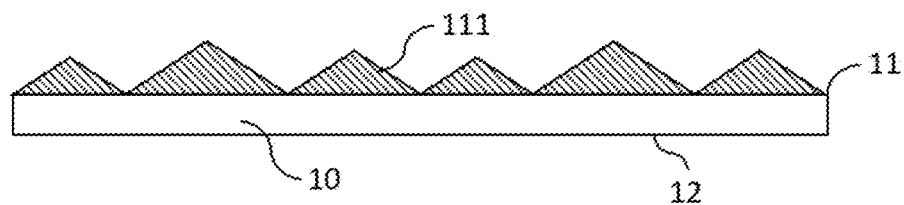
FIG. 1 is a schematic cross-sectional structural view of a housing assembly according to an embodiment of the present disclosure.

Embodiments of the present disclosure will be described in detail below. The embodiments described below are exemplary and are intended to explain the present disclosure only, but not to be construed as limiting the present disclosure. Where no specific techniques or conditions are indicated in the embodiments, the techniques or conditions are as described in literature of the art or in accordance with product specification. Where the reagents or apparatus used are not indicated with manufacturers, they are conventional products that are commercially available.

The present disclosure is based on the following discoveries and understandings of the inventors.

With user's increasingly high requirements for the appearance of electronic devices, a rich variety of decorative effects are also widely applied in electronic device housings. For an anti-glare glass, an etching chemical is applied on top of a glass in a spray manner, and after a period of reaction time, the glass is etched by the etching chemical, making a surface of the glass have a roughness of about 300 nm, thus achieving the effect of anti-glare matte surface. However, in actual use, the etched glass in related art is less expressive in appearance, and generally does not feel good for the hand to touch. In view of this, aspects of the disclosed solution may select or control the nature and morphology of the glass surface so as to form a shiny protrusion on the glass surface, such that the glass can be made to shine under illumination while having anti-glare and anti-fingerprint effects.

In view of this, in one aspect of the present disclosure, a housing assembly is provided in the disclosure. According to an embodiment of the present disclosure, referring to FIG. 1, the housing assembly may include a glass body 10, which has a first surface 11 and a second surface 12 opposite to the first surface. A plurality of protrusions 111 are formed on the first surface 11, and shiny spots are defined at the protrusions 111 on the first surface 11 under illumination. The protrusion satisfies any of the following conditions: the protrusion is a pointed protrusion; or the protrusion includes at least one edge. In an embodiment, the plurality of protrusions on the first surface can reflect light in different directions, and the glass can have a matte effect (or referred to as a frosted effect), while a pointed shape or a shape with at least one edge can produce a specular reflection and exhibit a shiny appearance effect under illumination, such that it can have an anti-glare, anti-fingerprint and shiny appearance effect at the same time, and there is no need to print shiny ink on the glass body. In this way, the production process can be simplified, and costs savings can be achieved.

In at least one embodiment, the pointed protrusion is at least one of a prism structure and a prism-like structure. Thereby, the pointed protrusion makes the light irradiated on the first surface produce a specular reflection, creating a shiny effect. Here, the prism structure and prism-like structure may be at least one of a trigonal (like) prism, a quadrilateral (like) prism, a pentagonal (like) prism, etc. The specular reflection exists on each side of such polyhedral pointed protrusions to form shiny spots, thus a plurality of different prism structures allow for a more pronounced and intense surface reflection of light, which in turn allows for a more pronounced shiny effect of the housing assembly. In at least one embodiment, the "prism-like structure" refers to a structure similar to a prism structure, such as a prism-like structure with a faceted top instead of a spike, or a prism-like structure with one or more surfaces that are curved, etc.

In at least one embodiment, "the protrusion including at least one edge" means that the protrusion includes at least two faces that are oriented differently and intersect with each other, and the location where two faces intersect (or referred to as "connect") may include an edge. For example, the protrusion may have a diamond-like shape that is capable of generating a specular reflection, thereby having a shiny appearance effect. In at least one embodiment, the shape of a protrusion having at least one edge includes, but is not limited to, a prism column (e.g., a trigonal prism column, a quadrilateral prism column, a pentagonal prism column, a hexagonal prism column, etc.), a prism cone (e.g., a trigonal prism cone, a quadrilateral prism cone, a pentagonal prism cone, etc.), a cube, an octahedron, etc.

In at least one embodiment, the protrusion may be constructed as at least one of hexagonal crystal form, cubic crystal form, trigonal crystal form and tetragonal crystal form, or the morphology of the protrusion belongs to at least one of hexagonal crystalline system crystal morphology, cubic crystalline system crystal morphology, trigonal crystalline system crystal morphology and tetragonal crystalline system crystal morphology. It is understood that the hexagonal crystalline system has four crystal axes, i.e., one vertical axis (z-axis) and three horizontal transverse axes (x-axis, y-axis and u-axis). Angles between the vertical axis and horizontal transverse axes are all approximately 90 degrees, angles between the three horizontal transverse axes are approximately 60 degrees, and the three horizontal transverse axes can coincide six times when rotated once around the z-axis. The cubic crystalline system, also referred to as an equiaxed crystalline system, has four threefold axes of symmetry, and meanwhile has either three fourfold axes of symmetry perpendicular to each other or three twofold axes of symmetry perpendicular to each other. The three fourfold axes or three twofold axes of symmetry are three crystallization axes of the crystal, which are of the same length and are perpendicular to each other. Crystals with a crystal shape or macroscopic property exhibiting the only high threefold axis or threefold anti-axis characteristic symmetrical elements are classified as a trigonal crystalline system, and crystals with fourfold axis or fourfold anti-axis characteristic symmetrical elements in a direction of main c-axis with the only highly secondary axes are classified as a tetragonal crystalline system. The protrusion in the above crystal forms has a better shiny effect under light conditions and contributes to the improvement of aesthetic appearance.

In at least one embodiment, "the morphology of the protrusion belonging to at least one of hexagonal crystalline system crystal morphology, cubic crystalline system crystal morphology, trigonal crystalline system crystal morphology and tetragonal crystalline system crystal morphology" should be understood in a broad sense, that is, the morphology of the protrusion is not necessarily identical to the hexagonal crystalline system crystal morphology, cubic crystalline system crystal morphology, trigonal crystalline system crystal morphology and tetragonal crystalline system crystal morphology. As long as the morphology of the protrusion is approximately the same as the hexagonal crystalline system crystal morphology, cubic crystalline system crystal morphology, trigonal crystalline system crystal morphology and tetragonal crystalline system crystal morphology, certain deviation is allowed to exist.

In an embodiment, the first surface 11 has a surface roughness of about 0.6-3.2 microns (such as about 0.6 microns, about 0.7 microns, about 0.8 microns, about 0.9 microns, about 1 micron, about 1.1 microns, about 1.2 microns, about 1.3 microns, about 1.4 microns, about 1.5 microns, about 1.6 microns, about 1.7 microns, about 1.8 microns, about 2.0 microns, about 2.1 microns, about 2.2 microns, about 2.3 microns, about 2.4 micron, about 2.5 micron, about 2.6 micron, about 2.7 micron, about 2.8 micron, about 2.9 micron, about 3 micron, about 3.1 micron, about 3.2 micron, etc.). The foregoing range of surface roughness makes it possible to have a more pronounced tactile sensation when touched, a better grip feeling and three-dimensional sense, and also better anti-slip and anti-fingerprint functions.

In some specific embodiments, the surface roughness of the first surface may be approximately 0.6 to 1.2 microns. Thereby, a larger surface roughness makes the specular reflection of light on the first surface more significant, which in turn further enhances the shiny effect of the housing assembly; if the surface roughness is less than 0.6 microns, not only will it relatively reduce the anti-glare and anti-fingerprint effects, but also reduce the shiny effect of the housing assembly; if the surface roughness is greater than 1.2 microns, the tactile sensation will be more pronounced.

In some specific embodiments, the surface roughness of the first surface 11 is about 1.3 to 3 microns (such as about 1.3 microns, about 1.4 microns, about 1.5 microns, about 1.6 microns, about 1.7 microns, about 1.8 microns, about 2.0 microns, about 2.1 microns, about 2.2 microns, about 2.3 microns, about 2.4 microns, about 2.5 microns, about 2.6 microns, about 2.7 microns, about 2.8 microns, about 2.9 microns, about 3 microns, etc.). This not only enhances the shiny effect, but also increases the anti-glare and anti-fingerprint effects, while the tactile sensation is obvious and the anti-slip effect is better.

In an embodiment, the first surface may have a haze of about 30% to 85%, (such as about 30%, about 35%, about 40%, about 45%, about 50%, about 55%, about 60%, about 65%, about 70%, about 75%, about 80%, about 85%, etc.). In this haze range, a better anti-glare and anti-fingerprint effect can be achieved, as well as the shiny appearance effect, such that the housing assembly has a more beautiful appearance effect.

In some specific embodiments, the haze of the first surface is about 30% to 50%, such as about 30%, about 35%, about 40%, about 45%, about 50%. As such, the housing assembly has a good anti-fingerprint and anti-glare effect. In some other specific embodiments, the haze of the first surface is about 50% to 85%, such as about 50%, about 55%, about 60%, about 65%, about 70%, about 75%, about 80%, about 85%, etc. As such, the anti-fingerprint and anti-glare effect of the housing assembly is better, and meanwhile can form a more intense contrast with the shiny effect, so the housing assembly can provide a more intense visual impact.

In some specific embodiments, the glass body has a transmittance of about 90% to 92%, such as about 90%, about 90.5%, about 91%, about 91.5%, about 92%, etc. Thereby, the housing assembly has a higher transmittance and a more expressive appearance, enabling a more beautiful appearance.

In some embodiments, the transmittance and haze of the glass body can both meet the above ranges, whereby the housing assembly can achieve high haze and high transmittance at the same time, and has a matte effect and good light transmission, allowing for a special appearance effect.

In an embodiment, the protrusion may be formed of crystals which are formed during the etching process. Crystals may be formed and adhered to a surface of the glass body during etching of the glass body, and the location where crystals are formed will prevent further etching, and the etchant will gradually etch inwardly along the perimeter of the crystals, i.e., the etchant conducts etching along the contour of the crystals, thus forming a protrusion constructed in a predetermined crystal form as described above.

In an embodiment, the protrusion has a size of about 1 to 110 microns, particularly may be about 1-30 microns, such as about 1 micron, about 5 microns, about 8 microns, about 10 microns, about 12 microns, about 15 microns, about 18 microns, about 20 microns, about 22 microns, about 25 microns, about 28 microns, about 30 microns, about 40 microns, about 50 microns, about 60 microns, about 70 microns, about 80 microns, about 90 microns, about 100 microns, about 110 microns, etc. The spacing distance between two adjacent pointed protrusions may be about 0 to 60 microns, particularly about 1 to 20 microns, such as about 0 micron, about 1 micron, about 2 microns, about 5 microns, about 8 microns, about 10 microns, about 12 microns, about 15 microns, about 18 microns, about 20 microns, about 30 microns, about 40 microns, about 50 microns, about 60 microns, and the like. In this size range, the protrusion has a cut surface in a diamond-like protruding shape, which provides a better light diffusion and reflection effect, and can provide better three-dimensional sense and grip feeling.

In at least one embodiment, the above "size of the protrusion" refers to a maximum value of the distance between any two points on a contour line of an orthographic projection of the protrusion on the glass body; the "distance between two adjacent protrusions" refers to a minimum value of the distance between two adjacent points on a contour line of an orthographic projection of the protrusion on the glass body.

In an embodiment, the protrusion has a height of about 1.3 to 3.6 microns, such as about 1.3 microns, about 1.5 microns, about 1.8 microns, about 2 microns, about 2.2 microns, about 2.5 microns, about 2.8 microns, about 3 microns, about 3.2 microns, about 3.5 microns, about 3.6 microns, etc. In this height range, the three-dimensional sense is more obvious and the appearance effect is better.

Figure 12:
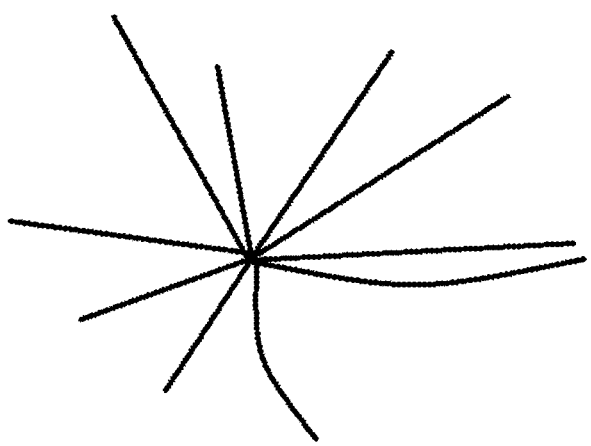
FIG. 12 is a schematic structural view of a pine needle-like protrusion according to an embodiment of the present disclosure.
Figure 13:
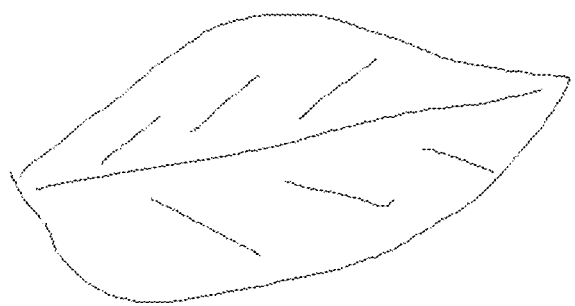
FIG. 13 is a schematic structural view of a leaf-like protrusion according to an embodiment of the present disclosure.

In an embodiment, the shape of the protrusion includes at least one of snowflake-like shape, spider web-like shape (see FIG. 2, where pointed protrusions of different sizes in the shape of spider web are illustrated), pine needle-like shape (see FIG. 12), and leaf-like shape (see FIG. 13). As such, it is possible to have different shiny effects, contributing to improvement of an aesthetic appearance.

In an embodiment, the glass body that may be adopted in the present disclosure may contain alumina. Further, a content of alumina in the glass body is greater than or equal to 20% by mass percentage, such as about 20%, about 25%, about 30%, about 35%, about 40%, etc. As such, the glass body may have better strength, wear resistance, machinability, and can be thinner in thickness, which better meet the requirements for use of the electronic device housing assembly.

In an embodiment, the glass body of the present disclosure may have a strength of about 560 to 600 MPa (such as about 560 MPa, about 570 MPa, about 580 MPa, about 590 MPa, about 600 MPa, etc.), a friction resistance of greater than or equal to 3000 times under 1 Kg load (such as about 3000 times, about 3100 times, about 3200 times, about 3300 times, about 3400 times, about 3500 times, about 3600 times, about 3700 times, about 3800 times, about 3900 times, about 4000 times, etc.). It is shown that the housing assembly of the present disclosure can have good mechanical properties and wear resistance properties, and can well meet the requirements for use in the field of electronic device.

Figure 3:
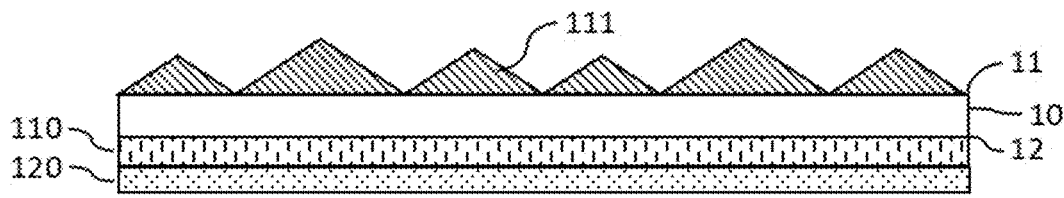
FIG. 3 is a schematic cross-sectional structural view of a housing assembly according to another embodiment of the present disclosure.

Further, in another embodiment of the present disclosure as illustrated in FIG. 3, the housing assembly may further include an optical coating layer 110 and a bottom cover ink layer 120 in addition to the glass body 10 mentioned above. The optical coating layer 110 is disposed on a second surface 12 of the glass body 10. The bottom cover ink layer 120 is disposed on a side of the optical coating layer 110 away from the first surface 11. Thereby, the provision of optical coating layer can enhance the appearance gloss and texture of the housing assembly, and the provision of bottom cover ink layer can ensure that the housing assembly is impervious to light, further guaranteeing a good appearance effect of the housing assembly.

Of course, a person skilled in the art may also provide other appearance decorative layers, such as UV transfer patterns, color gradient patterns and other patterns, on one side of the second surface, depending on the design needs for the appearance effect of the housing assembly.

In at least one embodiment, the housing assembly may be of a 2D structure, a 2.5D structure, or a 3D structure, and the specific shape and size can be selected according to actual needs of the electronic device, which is not described herein. Further, the housing assembly may be a rear cover of the electronic device, a mid-frame, or a 3D housing with the back cover and mid-frame molded in one piece, etc.

Figure 4:
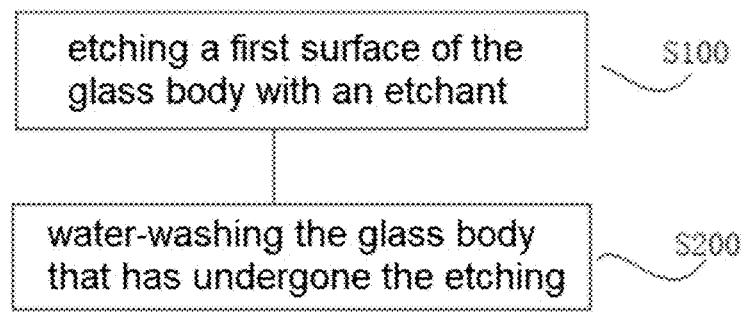
FIG. 4 is a schematic flow chart of a method for preparing a housing assembly according to an embodiment of the present disclosure.

In another aspect of the present disclosure, a method for preparing a housing assembly is provided. According to embodiments of the present disclosure, with reference to FIG. 4, the method may include the following operations.

At block S100, at least part of an outer surface of a glass body is etched with an etchant.

In this etching operation, the etchant may react with the glass body to form crystals attached to a surface of the glass body. The location where the crystals are formed will prevent further etching, and the etchant will gradually etch inwardly along the perimeter of the crystals, that is, the etchant etches along the contour of the crystals, thereby forming a protrusion.

In some specific embodiments, the above-described protrusion may be formed of sodium fluorosilicate. In an embodiment, sodium fluorosilicate can be directly generated by reacting glass with an etchant, making the preparation simple, easy and less costly. In an embodiment, silica in the glass can be first reacted with HF in the etchant:

$$SiO_2 + 4HF = SiF_4 + H_2O.$$

The specific reaction mechanism is:

$$—Si—O—Si— + H + F^- = —Si—OH + Si—F.$$

Then, —Si—OH can continue to react with HF:

$$Si(OH)_4 + 6HF = H_2SiF_6 + 4H_2O.$$

Among them, $SiF_4$ is gaseous under normal conditions, but not all of it can be volatilized and some may remain in the etchant, so that it can react with HF and fluoride in the etchant as follows:

$$4SiF_4 + 2HF + 3H_2O = 3H_2SiF_6 + H_2SiO_3$$

$$SiO_2 + 4HF = SiF_4 + H_2O$$

$$Al_2O_3 + 6HF = 2AlF_3 + 3H_2O$$

$$Na_2O + 2HF = 2NaF + H_2O.$$

And, the remaining $SiF_4$ in the etchant continues to react with the fluoride produced by the above reaction:

$$SiF_4 + 2KF = K_2SiF_6$$

$$SiF_4 + 2NaF = Na_2SiF_6$$

$$SiF_4 + 2NH_4F = (NH_4)_2SiF_6.$$

In the etchant of the present disclosure, based on a total number of moles of cations that can react with the fluorosilicic acid, the molar percentage of sodium ions may be greater than or equal to 80%, such as about 80%, about 82%, about 84%, about 86%, about 88%, about 90%, about 91%, about 92%, about 93%, about 94%, about 95%, about 96%, about 97%, about 98%, about 99%, about 99.5%, i.e., the fluorosilicate obtained by the reaction is mostly multi-angled sodium fluorosilicate, thus forming a housing assembly with protrusions on the surface. If the molar percentage of sodium ions is less than 80%, the first surface has more spherical protrusions formed of ammonium fluorosilicate and potassium fluorosilicate, and the spherical protrusions mainly cause diffuse reflection of light, rather than specular reflection, and thus are not effective in producing a shiny effect. In an embodiment, the etchant may be a saturated solution of sodium fluorosilicate. Thus, the formation of sodium fluorosilicate crystals is more facilitated, which in turn facilitates the formation of a pointed protrusion or a protrusion having at least one edge, to guarantee the appearance with a shiny effect.

Further, the etchant may include: about 10 to 30 wt. (e.g., about 10 wt., about 14 wt., about 18 wt., about 22 wt., about 26 wt., about 30 wt.) of NaF, about 30 to 50 wt. (e.g., about 30 wt., about 34 wt., about 38 wt., about 42 wt., about 46 wt., about 50 wt.) of NaHF2, about 5 to 10 wt. (e.g., about 5 wt., about 6 wt., about 7 wt., about 8 wt., about 9 wt., about 10 wt.) of NH4F, about 2.5 to 10 wt. (e.g., about 2.5 wt., about 5 wt., about 5.5 wt., about 7.5 wt., about 10 wt.) of fluorosilicic acid, about 35 to 50 wt. (e.g., about 35 wt., about 38 wt., about 40 wt., about 43 wt., about 45 wt., about 50 wt.) of inorganic acid, and about 30 to 50 wt. (e.g., about 30 wt., about 34 wt., about 38 wt., about 42 wt., about 46 wt., about 50 wt.) of water. Thereby, the etchant contains a large amount of sodium ions, which are then reacted to obtain a large amount of fluorosilicate attached to a surface of the glass body, thereby facilitating the formation of a spike-like protrusion. The ammonium fluoride serves as a buffering agent to maintain a stable pH in the etchant. The inorganic acid provides hydrogen ions which are reacted with fluoride ions to form hydrofluoric acid. In an embodiment, the etchant may consist of about 10 to 30 wt. of NaF, about 30 to 50 wt. of NaHF2, about 5 to 10 wt. of NH4F, about 2.5 to 10 wt. of fluorosilicic acid, about 35 to 50 wt. of inorganic acid, and about 30 to 50 wt. of water.

It is understood by those skilled in the art that when the etchant is of the formulation described above, the etchant has a molar percentage of sodium ions greater than or equal to 80%, based on the total number of moles of sodium and ammonium ions.

Further, the etchant may further include: about 5 to 10 wt. (e.g., about 5 wt., about 6 wt., about 7 wt., about 8 wt., about 9 wt., about 10 wt.) of barium sulfate. Thereby, the etchant can be kept in a state of suspension, which in turn can increase the viscosity of the etchant and make the etchant react more fully on the glass surface. In an embodiment, the etchant may consist of about 10 to 30 wt. of NaF, about 30 to 50 wt. of NaHF2, about 5 to 10 wt. of NH4F, about 2.5 to 10 wt. of fluorosilicic acid, about 35 to 50 wt. of inorganic acid, about 5 to 10 wt. of barium sulfate, and about 30 to 50 wt. of water.

Further, the etchant is previously cured prior to the etching treatment. Thereby, a stable hydrofluoric acid is formed in the etchant during the curing process to facilitate smooth etching treatment. Here, specific methods of curing treatment can be flexibly selected according to actual needs, and in some embodiments, the method of curing treatment is to place it at approximately 60° C. for a certain time (which time is the curing time). In some embodiments, the time for curing treatment can also be flexibly selected according to actual needs; for example, the curing time may be approximately 24 to 36 hours, such as about 24 hours, about 28 hours, about 32 hours or about 36 hours.

Figure 5:
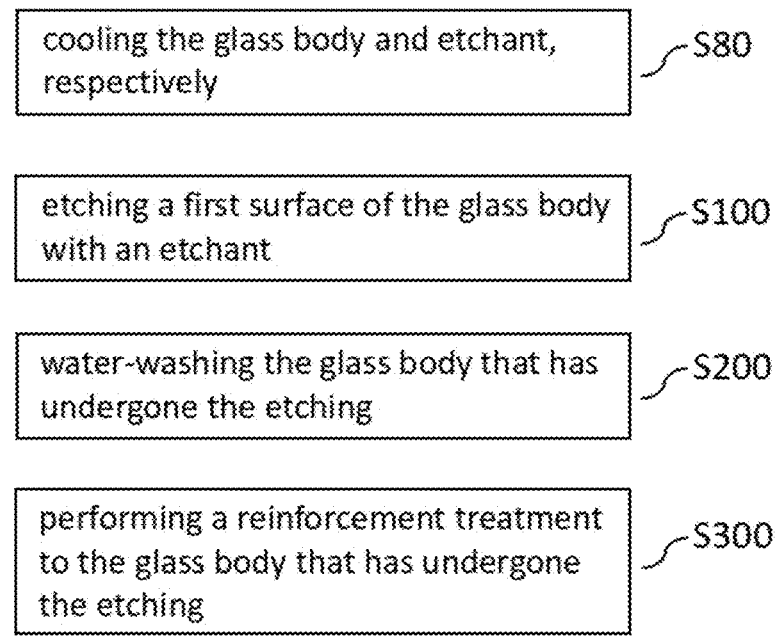
FIG. 5 is a schematic flow chart of a method for preparing a housing assembly according to another embodiment of the present disclosure.

In another embodiment as shown in FIG. 5, prior to the etching, the method may further include block S80: cooling the glass body and etchant respectively. Thereby, on the one hand, the etching speed can be slowed down, thereby facilitating control of different chemical reaction processes in the etching process, with a reduced reaction rate in the subsequent etching operation, which plays a good role in suppressing undesirable effects such as heterochromia and flow marks, and allows for continuous production; and on the other hand, low temperature is more conducive to the precipitation and formation of sodium fluorosilicate crystals, which in turn is more conducive to generating a protrusion with a shiny effect.

In some specific embodiments, cooling of the glass body is conducted with cold water, including but not limited to using cold water to spray the glass body, or immersing the glass body into cold water for cooling. In a specific example, the glass body may be immersed into cold water for cooling treatment, so that the glass body is more fully in contact with the cold water, which facilitates heat transfer and better cooling effect. In a specific example, cold water of about 3 to 8 degrees Celsius (such as about 3° C., about 4° C., about 5° C., about 6° C., about 7° C., about 8° C., etc.) is used to cool the glass body for about 10 to 15 s (such as about 10s, about 11s, about 12s, about 13s, about 14s, about 15s), etc. Thereby, the resulting low temperature glass has a suitable temperature, and is adapted to generate protrusions in a subsequent etching process.

In an embodiment, the temperature of the etchant after cooling treatment may be about 5 to 10 degrees Celsius, such as about 5° C., about 6° C., about 7° C., about 8° C., about 9° C., about 10° C., etc. In this temperature range, it is easier for sodium fluorosilicate crystals to be formed on the glass surface, and then the etchant etches down the sodium fluorosilicate crystals to form protrusions with a shiny effect. In some specific embodiments, the etchant may be continuously stirred while being cooled. Thus, the solution can be kept as homogeneous as possible, effectively avoiding etchant settling, thereby solving the problems such as poor etching effect and unevenness.

In some specific embodiments, this block 80 may include the following operations: immersing the glass body into ice water of about 3 to 8° C. to cool the glass for about 10 to 15s, so that the glass body is in a low temperature state, and then the etchant is cooled down and stirred, to make the etchant cool down at about 5 to 10° C. and present a milk-like consistency.

It is understood that the glass body may also be cleaned as desired prior to the cooling treatment. In an embodiment, the glass body may be water-washed and acid-washed to remove dirt from a surface of the glass body. In some specific embodiments, the glass body may be water-washed for about 20 to 30s, to remove a small amount of polishing powder and other easily removable dirt remaining on the glass surface, and then the glass body may be acid-washed for about 15 to 20s with a hydrofluoric acid at a mass concentration of about 5%, to remove the oil and dirt on a surface of the glass body that is difficult to remove, to achieve an overall and uniform cleaning and activation effect for the glass body.

Figure 6:
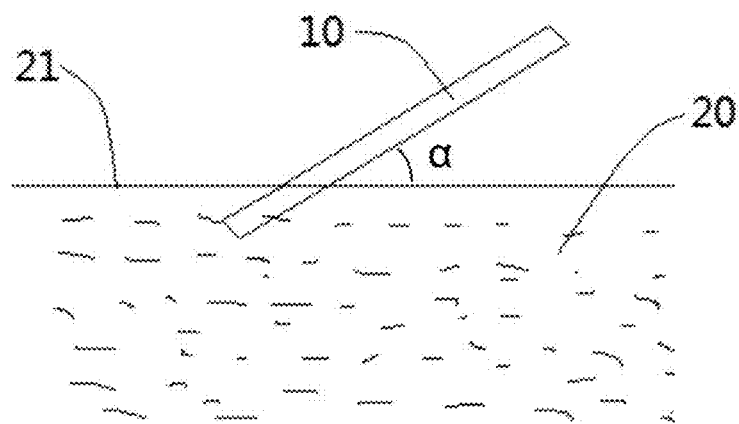
FIG. 6 is a schematic view of an etching operation according to an embodiment of the present disclosure.

In the above etching operation 100, referring to FIG. 6, the glass body 10 can be immersed in the etchant 20 at an inclination angle α of about 30 to 45 degrees (such as about 30 degrees, about 32 degrees, about 35 degrees, about 38 degrees, about 40 degrees, about 42 degrees, about 45 degrees, etc.). The inclination angle α is an angle between the glass body 10 and a liquid level 21 of the etchant 20. Immersing the glass body into the etchant at this inclination angle allows the glass body to be immersed into the etchant in a smaller depth, facilitating operation and less etchant usage, facilitating cost saving, and also facilitating formation of the protrusions.

In the above etching operation 100, the glass body may oscillate in a direction parallel to the liquid level of the etchant, after the glass body is immersed into the etchant. Oscillation of the glass body prevents the etchant from settling and the formed crystals from obscuring each other, making the etching more uniform and guaranteeing density and uniformity of the formed protrusions.

In an embodiment, the etching time may be about 60 to 300 seconds (such as about 60 seconds, about 70 seconds, about 80 seconds, about 90 seconds, about 100 seconds, about 110 seconds, about 120 seconds, about 130 seconds, about 140 seconds, about 150 seconds, about 160 seconds, about 170 seconds, about 180 seconds, about 190 seconds, about 200 seconds, about 210 seconds, about 220 seconds, about 230 seconds, about 240 seconds, about 250 seconds, about 260 seconds, about 270 seconds, about 280 seconds, about 290 seconds, about 300 seconds, etc.). Thereby, the etching treatment time can be determined according to the rapidity of reaction rate between the etchant and the glass body, and within this time range, the glass body can react sufficiently with the etchant to attach a layer of sodium fluorosilicate uniformly on the surface, which in turn facilitates obtainment of a first surface with a uniform distribution of protrusions. In addition, the etching time can make the protrusions have a suitable size to obtain a more uniform and beautiful shiny appearance effect, while having a relatively large haze and roughness, which in turn has an anti-glare function, an anti-fingerprint function and a better grip feeling.

In at least one embodiment, prior to the etching treatment, the method can further include: forming a protective layer on surfaces of the glass body other than the first surface; performing a pre-cleaning treatment on the first surface. Thus, by providing the protective layer, surfaces of the glass body other than the first surface can be prevented from contacting with the etchant; the pre-cleaning treatment can remove impurities such as oil stains on the first surface in advance, guaranteeing smooth etching treatment and uniformity of the etched surface.

Further, the material of the protective layer can be ink, so that not only can other parts of the glass body be prevented from being corroded by the etchant, but also the ink with better stability in the etchant will not participate in the reaction and produce side effects. The method of pre-cleaning treatment has no special requirements, as long as the stain can be cleaned without damage to the glass; for example, an acid liquid without hydrofluoric acid or a liquid ammonia can be used for cleaning.

At block S200, the glass body, that has undergone the etching, is water-washed.

In this block, the crystals formed in the etching operation can be removed by water-washing, thereby exposing a pointed protrusion or a protrusion having at least one edge.

In an embodiment, water-washing may include: performing an ambient water washing and a warm water washing on the shiny glass in sequence. In some specific embodiments, warm water used for the warm water washing has a temperature of about 35 to 40 degrees Celsius (such as about 35° C., about 36° C., about 37° C., about 38° C., about 39° C., about 40° C., etc.). Among them, the ambient water washing can wash away residual etchant and crystalline salts or the like from the glass surface, while the warm water can have a better cleaning ability to further clean surfaces of the glass body after etching, and remove residual crystals. In some specific embodiments, the glass can be washed with ambient water for about 20 to 30s after etching, and then warm water at about 35° C. to 40° C. is used to clean the glass surface again for about 20 to 30s.

Further, according to actual needs, the glass can be set up in water after warm water washing, i.e., the washed shiny glass is set up in the water, so as to avoid its corrosion by acid gas or acid fluid.

In another embodiment as shown in FIG. 5, subsequent to the water-washing, the method may further include block S300: performing a reinforcement treatment to the glass body that has undergone the etching. The specific reinforcement post treatment may be conducted according to conventional techniques (e.g. ion exchange or the like) and will not be repeated herein. As such, surface stress of the glass can be enhanced to make it have a better mechanical strength.

It is understood that in some embodiments, the first surface formed in this method may be consistent with the first surface of a glass body in the above-described housing assembly, that is, has the same features and advantages, and will not be described in detail herein.

In at least one embodiment, the method may further include at least one of CNC machining of the glass body, applying a decorative film sheet and coating an anti-fingerprint film. The sequence of the above steps in the CNC machining, applying a decorative film sheet and coating an anti-fingerprint film, and etching the glass body can be adjusted as desired. In some specific embodiments, the glass may be CNC machined after the etching operation is completed, to cut off the heterochromia at the temporary hole location and shape the camera hole location, and then the glass may be reinforced to increase the strength of the glass, followed by coating an anti-fingerprint film after applying a film to provide the housing with anti-fingerprint, hydrophobic and oleophobic effects, and then a decorative film sheet is applied to decorate the housing. Further, according to actual needs, the steps of applying accessories, lenses, etc., can also be performed.

The method in the present disclosure is simple in processes and easy to operate, and can create protrusions with refractive and diffractive effects on the glass surface, so that the resulting glass or housing assembly may have a shiny effect under light conditions, while having both anti-glare and anti-fingerprint effects, and the range of surface roughness makes the glass have a better three-dimensional sense and grip feeling.

In a further aspect of the present disclosure, an electronic device is provided. According to an embodiment of the disclosure, the electronic device includes a housing assembly, a display assembly connected to the housing assembly, and a motherboard. The housing assembly includes a glass body which has a first surface and a second surface opposite to the first surface. A plurality of protrusions are formed on the first surface. The protrusion is a pointed protrusion, or the protrusion includes at least one edge. A mounting space is defined between the display assembly and the housing assembly. The motherboard is disposed in the mounting space and is electrically connected to the display assembly. In an embodiment, the housing assembly may be a housing assembly described above, or a housing assembly prepared by the method described above. In this way, the electronic device may have shiny, anti-glare, anti-fingerprint, three-dimensional sense and better grip feeling, and can exhibit better appearance, which is conducive to improving user experience.

Figure 7:
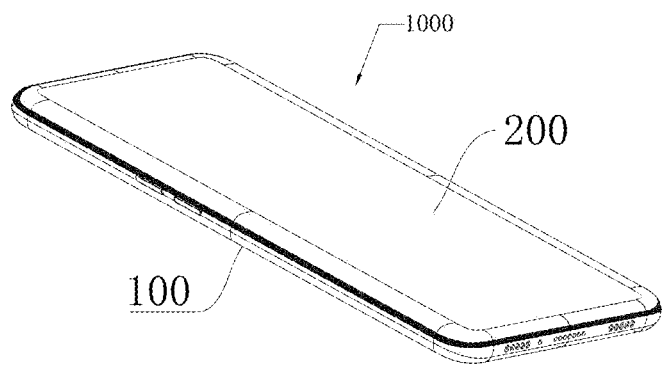
FIG. 7 is a schematic structural view of an electronic device according to an embodiment of the present disclosure.

The electronic device including the above-described housing assembly is taken as an example. Referring to FIG. 7, the electronic device 1000 includes: a housing assembly 100 described above; a display assembly 200 connected to the housing assembly 100, and a motherboard. A mounting space is defined between the display assembly 200 and the housing assembly 100. The motherboard is disposed in the mounting space and is electrically connected to the display assembly. As such, the housing of the electronic device has the anti-fingerprint, anti-glare and pearlescent effects simultaneously. It is understood by those skilled in the art that the electronic device has all of the features and advantages of the previously described housing assembly and will not be repeated herein.

Embodiments of the present invention are described in detail below.

Embodiment 1

Figure 8:
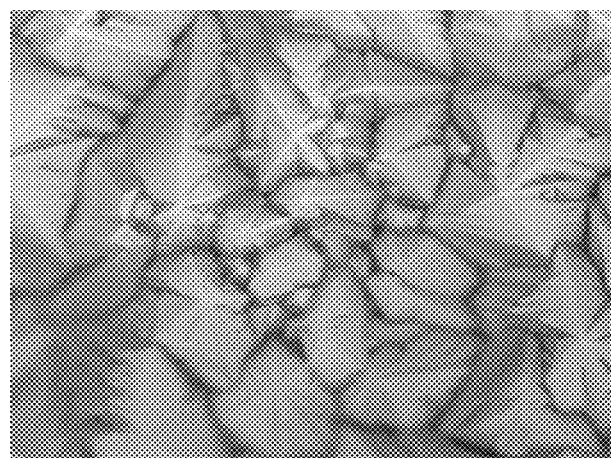
FIG. 8 is an electron microscope photograph of a first surface of the glass body in Embodiment 1 of the present disclosure, magnified by about 500 times.
Figure 9:
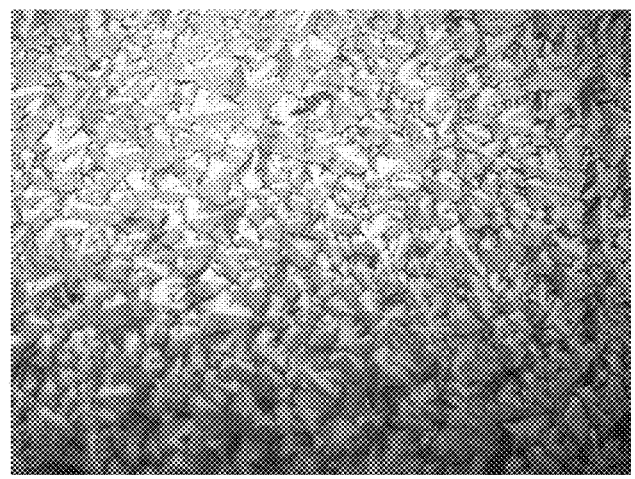
FIG. 9 is an electron microscope photograph of the first surface of the glass body in Embodiment 1 of the present disclosure, magnified by about 100 times.

The method of preparing the housing assembly include:
1. preparing an etchant: mixing 20 wt. of NaF, 50 wt. of NaHF$_2$, 5 wt. of NH$_4$F, 5 wt. of fluorosilicic acid, 50 wt. of inorganic acid, 10 wt. of barium sulfate, and 30 wt. of water, stirring evenly, and curing for 24 hours;
2. providing a protective layer on surfaces of the glass body other than the first surface;
3. immersing the glass body obtained in operation 2 into the etchant and etching for 120 seconds;
4. taking out the glass after etching treatment in operation 3, cleaning it to remove sodium fluorosilicate attached to the first surface, and removing the protective layer to obtain a housing assembly, whose electron microscope photographs are shown in FIG. 8 (magnified by about 500 times) and FIG. 9 (magnified by about 100 times).

Comparison Example 1

The method of preparing the housing assembly include:
1. preparing an etchant: mixing 30 wt. of NaF, 30 wt. of NH$_4$HF$_2$, 10 wt. of NH$_4$F, 10 wt. of fluorosilicic acid, 50 wt. of inorganic acid, 10 wt. of barium sulfate, and 30 wt. of water, stirring evenly, and curing for 24 hours;
2. providing a protective layer on surfaces of the glass body other than the first surface;
3. immersing the glass body obtained in operation 2 into the etchant and etching for 120 seconds;
4. taking out the glass after etching treatment in operation 3, cleaning it to remove sodium fluorosilicate attached to the first surface, and removing the protective layer to obtain a housing assembly.

Comparison Example 2

Figure 10:
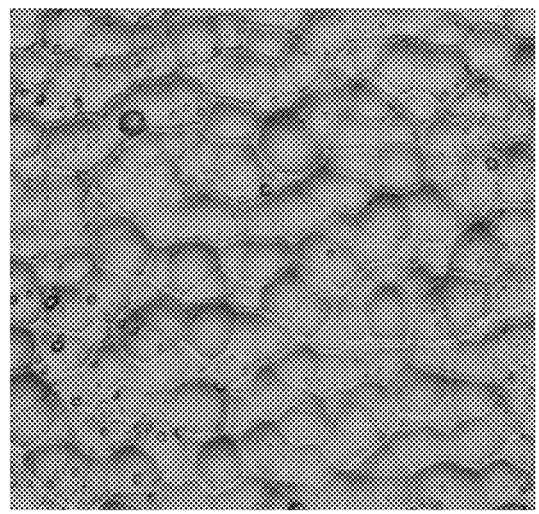
FIG. 10 is an electron microscope photograph of the glass surface in Comparison Example 2 of the present disclosure, magnified by about 100 times.

The method of preparing the housing assembly may include:
1. preparing an etchant: mixing 20 wt. of KF, 40 wt. of KHF$_2$, 5 wt. of NH$_4$F, 10 wt. of fluorosilicic acid, 50 wt. of inorganic acid, 10 wt. of barium sulfate, and 30 wt. of water, stirring evenly, and curing for 24 hours;
2. providing a protective layer on surfaces of the glass body other than the first surface;
3. immersing the glass body obtained in operation 2 into the etchant and etching for 120 seconds;
4. taking out the glass after etching treatment in operation 3, cleaning it to remove sodium fluorosilicate attached to the first surface, and removing the protective layer to obtain a housing assembly, whose electron microscope photograph is shown in FIG. 10, magnified by about 100 times.

The housing assemblies obtained in Embodiment 1 and Comparison Examples 1-2 are tested. The test results are shown in Table 1.

TABLE 1

| | Surface roughness Ra | Haze | Raised or recessed structure | Shiny effect |
|---|---|---|---|---|
| Embodiment 1 | 0.6 microns | 60% | Pointed protrusion or protrusion including at least one edge | Level 1 |

TABLE 1-continued

|  | Surface roughness Ra | Haze | Raised or recessed structure | Shiny effect |
|---|---|---|---|---|
| Comparison Example 1 | 0.4 microns | 60% | Sphere recess or protrusion | Level 2 |
| Comparison Example 2 | 0.6 microns | 60% | Sphere recess or protrusion | Level 3 |

Figure 2:
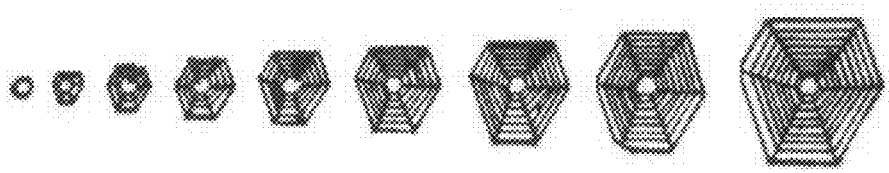
FIG. 2 is a schematic structural view of a spider web-like protrusion according to an embodiment of the present disclosure.

As shown, the surface roughness Ra of the housing assembly in Embodiment 1 is about 0.6 microns, while the surface roughness Ra of the housing assemblies in Comparison Examples 1-2 is about 0.4 and 0.6 microns, respectively. The haze of the housing assemblies in all of the Embodiment 1 and Comparison Examples 1-2 is about 60%. Herein, the grade of shiny effect (or referred to as pearlescent effect) in the Embodiment 1 and Comparison Examples 1-2 refers to superiority ranking of shiny effect of the housing assemblies obtained in these three examples, where FIG. 1 and FIG. 2 are electron microscope photographs of Embodiment 1; FIG. 10 is an electron microscope photograph of the housing assembly of Comparison Example 2 magnified by about 100 times. The advantages and disadvantages of the shiny effect of the housing assemblies obtained in Embodiment 1 and Comparison Examples 1-2 are ranked in order from Level 1 to Level 3, where Level 1 is the best, with obvious shiny effect; Level 2 has poor shiny effect; and Level 3 is the worst, with almost no shiny effect.

Embodiment 2

Figure 11:
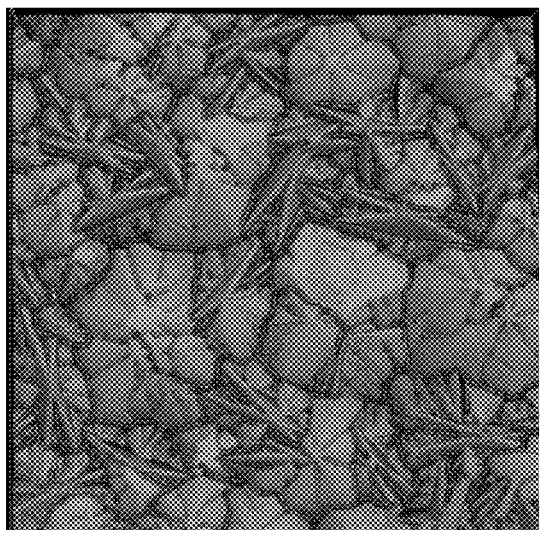
FIG. 11 is a 3D super depth-of-field microscope photograph of a first surface of the glass body in Embodiment 2 of the present disclosure.

1. using the glass with an alumina content of 25%, and water-washing for 20s;
2. acid-washing: acid-washing with 5% hydrofluoric acid for 20s;
3. cooling the glass with ice water of 3 to 8° C. for 10s;
4. cooling the etchant (the same as Embodiment 1) to a state of 10° C., supplemented by stirring; when the etchant presents a milk-like consistency, immersing the glass quickly into the etchant with an inclination angle of 30°, and keeping it oscillate left and right in the liquid, etching for 120s;
5. washing the glass with ambient water for about 20s, then cleaning the glass surface again with 40° C. water for 30s;
6. setup in water: setting up the washed glass in water;
7. CNC twice: cutting off heterochromia at the temporary hole location, and shaping the camera hole location;
8. strengthening: using ion exchange method to increase strength of the glass;
9. AF coating after film application;
10. applying decorative film sheet, applying auxiliary materials, lenses, etc., to obtain the housing assembly, whose 3D super depth-of-field microscope photograph is shown in FIG. 11.

Embodiment 3

1. using the glass with an alumina content of 25%, and water-washing for 30s;
2. acid-washing: acid-washing with 5% hydrofluoric acid for 18s;
3. cooling the glass with ice water of 3 to 8° C. for 15s;
4. cooling the etchant (the same as Embodiment 1) to a state of 8° C., supplemented by stirring; when the etchant presents a milk-like consistency, immersing the glass quickly into the etchant with an inclination angle of 45°, and keeping it oscillate left and right in the liquid, etching for 80s;
5. washing the glass with ambient water for about 30s, then cleaning the glass surface again with 38° C. water for 30s;
6. setup in water: setting up the washed glass in water;
7. CNC twice: cutting off heterochromia at the temporary hole location, and shaping the camera hole location;
8. strengthening: using ion exchange method to increase strength of the glass;
9. AF coating after film application;
10. applying decorative film sheet, applying auxiliary materials, lenses, etc., to obtain the housing assembly.

Embodiment 4

1. using the glass with an alumina content of 25%, and water-washing for 25s;
2. acid-washing: acid-washing with 5% hydrofluoric acid for 15s;
3. cooling the glass with ice water of 3 to 8° C. for 12s;
4. cooling the etchant (the same as Embodiment 1) to a state of 5° C., supplemented by stirring; when the etchant presents a milk-like consistency, immersing the glass quickly into the etchant with an inclination angle of 40°, and keeping it oscillate left and right in the liquid, etching for 60s;
5. washing the glass with ambient water for about 25s, then cleaning the glass surface again with 35° C. water for 25s;
6. setup in water: setting up the washed glass in water;
7. CNC twice: cutting off heterochromia at the temporary hole location, and shaping the camera hole location;
8. strengthening: using ion exchange method to increase strength of the glass;
9. AF coating after film application;
10. applying decorative film sheet, applying auxiliary materials, lenses, etc., to obtain the housing assembly.

Performance Test

Strength Test Method: Four-Point Bending Test.

Friction resistance performance test method: using Bonstar 0000 #steel wool, 20 mm×20 mm to rub product surface, in a motion direction along the direction of the steel wool fibers, under 1 Kg load, with a test frequency of 60 times/min (once for one reciprocal movement), and a stroke of 30 to 40 mm; checking once per 100 rubs, until the occurrence of obvious appearance defects.

Shiny Performance Test: Naked Eye Observation.

Pointed protrusion size and interval measurement: observation and measurement with 3D super depth-of-field microscope.

Test Results

The first surface of the housing assembly in Embodiments 2-4 has a roughness of about 1.3 to 3.2 microns; the transmittance is about 90 to 92%; the haze is about 70 to 85%; the first surface has a diamond-like sparkle sense when judged by the naked eye against light; the protrusion has a size of about 15 to 110 microns; a spacing distance between two adjacent protrusions is 0 to 60 microns; the four-point bending strength is about 560 to 600 MPa; friction resistance: steel wool resistance is greater than 3000 times under 1 Kg load; surface roughness of the glass body in the housing assembly of Comparison Example 2 is more than 300 nm, the haze is 50%, and the light transmission rate is 85%.

In description of this specification, reference terms such as "an embodiment", "some embodiments", "example", "specific example", "some examples", or "certain examples" and the like means that, the specific features, structures, materials, or characteristics described in view of the embodiment or example are included in at least one embodiment or example of the present disclosure. In this specification, schematic representation for the foregoing terms does not have to be directed to the same embodiment or example. Moreover, the specific features, structures, materials, or characteristics described may be combined in a suitable manner in any one or more embodiments or examples. In addition, without contradicting each other, persons skilled in the art may combine and merge different embodiments or examples described in this specification, as well as features of the different embodiments or examples.

It is understood that the terms "first", "second" and the like in the present disclosure are used to describe various components but these components are not limited by these terms. Such terms are only used to distinguish a component from another component, but not to indicate or imply relative importance or the number of technical features as indicated. Moreover, in the description of the disclosure, "a plurality of" means at least two, e.g., two, three and so on, unless otherwise specified.

Though embodiments of the present disclosure have been illustrated and described above, it is understood that the above embodiments are exemplary and are not to be construed as limiting the disclosure; those of ordinary skill in the art may make variations, modifications, substitutions and variants of the above embodiments within the scope of the present disclosure.

What is claimed is:

1. A housing assembly, comprising:
   a glass body, having a first surface and a second surface opposite to the first surface;
   a plurality of protrusions being formed on the first surface, wherein the plurality of protrusions are pointed protrusions, or the plurality of protrusions comprise at least one edge;
   wherein the first surface has a surface roughness of about 2 to 3.2 microns; and
   the plurality of protrusions satisfy at least one of the following conditions:
      the plurality of protrusions have a size of about 30 to 110 microns;
      the plurality of protrusions have a height of about 1.3 to 3.6 microns; and/or
      a spacing distance between two adjacent protrusions is equal to or greater than 0 to 60 microns.

2. The housing assembly as claimed in claim 1, wherein the plurality of protrusions are constructed in at least one of hexagonal crystal form, cubic crystal form, trigonal crystal form and tetragonal crystal form.

3. The housing assembly as claimed in claim 1, wherein at least one of the following conditions is met:
   the first surface has a haze of about 30% to 85%; and/or
   the glass body has a transmittance of about 90% to 92%.

4. The housing assembly as claimed in claim 3, wherein the haze is about 30% to 50%.

5. The housing assembly as claimed in claim 3, wherein the surface roughness is about 2 to 3 microns; and/or
   the haze is about 50% to 85%.

6. The housing assembly as claimed in claim 1, wherein the plurality of protrusions further satisfy the following condition:
   a shape of the pointed protrusions includes at least one of snowflake-like, spider web-like, pine needle-like and leaf-like shapes.

7. The housing assembly as claimed in claim 6, wherein the spacing distance between two adjacent protrusions is about 1 to 20 microns.

8. The housing assembly as claimed in claim 1, wherein the glass body contains alumina, and a content of the alumina in the glass body is greater than or equal to 20% by mass percentage.

9. The housing assembly as claimed in claim 1, wherein the glass body meets at least one of the following conditions:
   a strength of about 560 to 600 MPa; and/or
   a friction resistance under about 1 Kg load is greater than or equal to 3000 times.

10. An electronic device, wherein the electronic device comprises:
    a housing assembly, the housing assembly comprising a glass body which has a first surface and a second surface opposite to the first surface, a plurality of protrusions being formed on the first surface, wherein the plurality of protrusions are pointed protrusions, or the plurality of protrusions comprise at least one edge;
    a display assembly, the display assembly being connected to the housing assembly, a mounting space being defined between the display assembly and the housing assembly; and
    a motherboard, the motherboard being disposed in the mounting space and electrically connected to the display assembly;
    wherein the first surface has a surface roughness of about 2 to 3.2 microns; and
    the plurality of protrusions satisfy at least one of the following conditions:
       the plurality of protrusions have a size of about 30 to 110 microns;
       the plurality of protrusions have a height of about 1.3 to 3.6 microns; and/or
       a spacing distance between two adjacent protrusions is equal to or greater than 0 to 60 microns.

11. A method for preparing a housing assembly, wherein the method comprises:
    etching at least part of an outer surface of a glass body with an etchant; and
    water-washing the glass body that has undergone the etching, the glass body after etching and water-washing having a first surface and a second surface opposite to the first surface, a plurality of protrusions being formed on the first surface, wherein the plurality of protrusions are pointed protrusions, or the plurality of protrusions comprise at least one edge;
    wherein the first surface has a surface roughness of about 2 to 3.2 microns; and
    the plurality of protrusions satisfy at least one of the following conditions:
       the plurality of protrusions have a size of about 30 to 110 microns;
       the plurality of protrusions have a height of about 1.3 to 3.6 microns; and/or
       a spacing distance between two adjacent protrusions is equal to or greater than 0 to 60 microns.

12. The method as claimed in claim 11, wherein a molar percentage of sodium ions in the etchant is greater than or equal to 80%, based on a total number of moles of cations that can react with a fluorosilicic acid.

13. The method as claimed in claim 11, wherein prior to the etching, the method further comprises:

cooling the glass body and the etchant, respectively.

14. The method as claimed in claim 13, wherein cooling of the glass body is conducted with cold water of about 3 to 8 degrees Celsius to cool the glass body for about 10 to 15 s.

15. The method as claimed in claim 13, wherein the etchant after cooling treatment has a temperature of about 5 to 10 degrees Celsius.

16. The method as claimed in claim 11, wherein in the etching operation:

the glass body is immersed into the etchant at an inclination angle of about 30 to 45 degrees, the inclination angle being an angle between the glass body and a liquid level of the etchant, and then the glass body is oscillated in a direction parallel to the liquid level of the etchant.

17. The method as claimed in claim 11, wherein the etchant comprises:

about 10 to 30 wt. of NaF;
about 30 to 50 wt. of $NaHF_2$;
about 5 to 10 wt. of $NH_4F$;
about 2.5 to 10 wt. of fluorosilicic acid;
about 35 to 50 wt. of inorganic acid; and
about 30 to 50 wt. of water.

18. The method as claimed in claim 17, wherein the etchant further comprises about 5 to 10 wt. of barium sulfate.

19. The method as claimed in claim 11, wherein the water-washing comprises:

washing the glass body that has undergone the etching with ambient water and warm water in sequence, wherein the warm water has a temperature of about 35 to 40 degrees Celsius.

20. The method as claimed in claim 11, wherein after the etching, the method further comprises:

performing a strengthening treatment to the glass body that has undergone the etching.

* * * * *